United States Patent [19]

Ueda

[11] Patent Number: 5,240,597

[45] Date of Patent: Aug. 31, 1993

[54] WASTE WATER TREATMENT EQUIPMENT

[75] Inventor: Iwao Ueda, 416, Nanbacho, Nishikiyamachidori Matsubarasagaru, Shimogyo-ky, Kyoto, Japan

[73] Assignees: Iwao Ueda; Chie Ueda; Etsuko Ueda, Kyoto, Japan

[21] Appl. No.: 827,105

[22] Filed: Jan. 29, 1992

[30] Foreign Application Priority Data

Jan. 30, 1991 [JP] Japan .................. 3-060839

[51] Int. Cl.$^5$ .................. C02F 3/02; C02F 11/02
[52] U.S. Cl. .................. 210/149; 210/151; 210/178; 210/199; 210/202; 210/187; 210/206; 210/319; 210/320; 210/258
[58] Field of Search ............. 210/149, 151, 170, 150, 210/177, 178, 187, 205, 206, 207, 208, 221.2, 532.2, 199, 179, 202, 319, 320, 258

[56] References Cited

U.S. PATENT DOCUMENTS

| | | | |
|---|---|---|---|
| 3,260,368 | 7/1966 | Wagner et al. | 210/178 |
| 3,607,737 | 9/1971 | Gamer | 210/149 |
| 3,875,056 | 4/1975 | Inglis | 210/532.2 |
| 4,002,561 | 1/1977 | Traverse | 210/532.2 |
| 4,608,157 | 8/1986 | Graves | 210/532.2 |
| 4,678,567 | 7/1987 | Ueda | 210/150 |
| 4,680,111 | 7/1987 | Ueda | 210/150 |
| 4,927,530 | 5/1990 | Ueda | 210/149 |
| 4,940,539 | 7/1990 | Weber | 210/149 |

Primary Examiner—Peter Hruskoci
Assistant Examiner—Robert James Popovics
Attorney, Agent, or Firm—Lowe, Price, LeBlanc & Becker

[57] ABSTRACT

A waste water treatment equipment adapted to treat, with high removal performance at all times, waste water drained from various sources such as sewage containing solid wastes left after crushing garbage sent out from cooking room, home kitchen, etc. The equipment is provided with a pretreatment device in which chemical is supplied to a treatment tank so as to accellerate decomposition of the solid waste left after crushing garbage by fermentation and putrefaction, and digestion of the solid wastes and water pollution materials by anaerobic bacteria. The sewage pretreated in the pretreatment device is introduced in a sewage treatment device in which sewage is caused to flow in a plurality of sewage treament tanks sequentially in order, and the pollution materials such as BOD, COD, etc. in the sewage are subject to oxidation decomposition and removal by activated sludge process beds of specific configuration in which arrangement of activated sludge varies for each tank. A settling tank and a disinfecting tank are further provided.

1 Claim, 3 Drawing Sheets

Fig. 3
Fig. 4
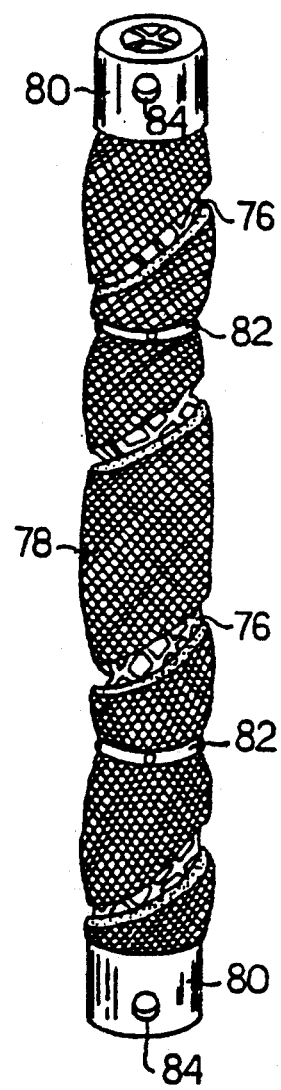
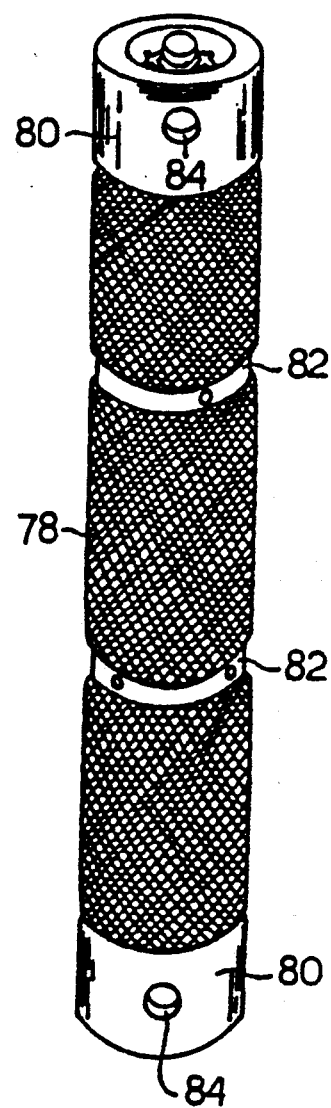
Fig. 5
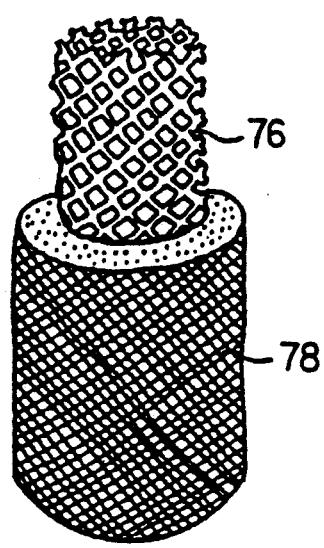

WASTE WATER TREATMENT EQUIPMENT

BACKGROUND OF THE INVENTION

1. Field of the Invention

The present invention relates to a waste water treatment equipment for treating sewage containing solid wastes left after crushing garbage sent out from cooking room, home kitchen and the like, or waste water sent out from water closet, bath and the like.

2. Description of Prior Art

With regard to equipment for treating sewage sent out from home water closet, kitchen, bath, etc., several attemps have been proposed as disclosed in Japanese Patent Publications (examined) SHO 60-29319 and HEI 1-60313. That is, the Japanese Patent Publication SHO 60-29319 disclosed a sewage treatment equipment to perform a series of operations comprising the steps of: removing relatively large materials insoluble or difficult to be dissolved from the sewage sent out from home water closet by introducing the sewage in a screen of large meshes; compressing fine suspended solid (hereinafter referred to as "SS") in the sewage by compressor having very fine filter medium thereby separating the SS and removing 85 to 98% of water therefrom; supplying the dewatered SS into a SS deposit tank; introducing the sewage filtered through the mentioned fine filter medium into an aeration tank in which sponge activated sludge process beds are vertically provided to perform aeration for decomposition of water pollution materials such as BOD, COD in the sewage water by oxidation; and disinfecting the materials by chloride. When employing such prior sewage treatment equipment, as a result of forcibly removing large SS and fine SS in the steps of earlier half of the treament, BOD concentration in the sewage is reduced to about 50 ppm, and this BOD concetration is finally reduced to not more than 3 ppm by the treatment of low load performed in the steps of latter half in the activated sludge process beds and disinfection by chloride. Then, the Japanese Patent Publication No. HEI 1-60313 discloses a sewage tratment equipment to perform operations comprising the steps of: introducing sewage sent out of home water closet, kitchen, etc. into a solid waste removing device to crush solid wastes or materials condensed in the sewage; separating and removing large solid wastes; introducing the sewage whose large solid waste have been removed sequentially into a plurality of sewage treatment tanks formed by vertically providing activated sludge process beds above the aeration tank disposed on the bottom, each of the activated sludge process beds being formed of an elongated cylindrical core of which grid-like outer periphery is wrapped with a porous member of certain thickness; changing shapes of the activated sludge process beds each vertically provided in each of the sewage treatment tanks; performing treating operations starting from a treatment of high load to that of low load in said plurality of sewage treatment tanks; causing the sewage thus treated to flow sequentially in a settling tank and a disinfecting tank; and draining the treated sewage of not more than 3 ppm.

Any of the above sewage treatment equipment disclosed in the Japanese Patent Publications SHO 60-29319 and HEI 1-60313 exhibits high performance of purification, however, have several disadvantages. In case of the sewage treatment equipment disclosed in the Japanese Patent Publication SHO 60-29319, a compressor with a very fine filter medium is employed in the earlier half of the treatment. This compressor is operated to forcibly remove very fine SS thereby BOD concentration of the filtered sewage is reduced to a certain extent and then required treatment of low load takes place in the aeration trank with active sludge process bed. Accordingly, the compressor is intricated in its construction and has many movable parts, and moreover is provided with very fine filter medium. As a result, there arise such disadvantages as troublesome maintenance and operation taking much labor and long time, easy occurrence of trouble, etc.

In any of the sewage treatment wquipment disclosed in the Japanese Patent Publications SHO 60-29319 and HEI 1-60313, there still remain further disadvantes in the aspect of treating sewage containing solid wastes left after crushing gasbage sent out from cooking room, home kitchen, etc. More specifically, when treating a sewage containing solid wastes by means of compressor, the dewatered solid wastes are delivered to the reservoir, or relatively large solid wastes and fibrous materials left after crushing garbage in the sewage introduced in the solid waste removing device are accumulatively deposited in the solid waste reservoir, and these deposited solid wastes separately need additional troublesome treatments.

SUMMARY OF THE INVENTION

The present invention was made to overcome the above-discussed disadvantages and has an object of providing a waste water treatment equipment which is suitable for treating various waste waters sent out from various sources such as sewage containing solid wastes left after crushing garbage sent out from cooking room, home kitchen, etc., and which is not so troublesome in maintenance, relatively easy in routine operations, and carries out sewage treatment with very high removing performance.

In order to accomplish the foregoing object, a waste water treatment equipment in accordance with the present invention comprises a pretreatment device which is disposed before a sewage treatment device removing water pollution materials in sewage such as BOD, COD, etc. using activated sludge process beds, and which causes the solid wastes contained in sewage left after crushing garbage sent out from cooking room, home kitchen, etc. to be decomposed by fermentation or putrefaction and causes said solid wastes and water pollution materials to be digested by anaerobic bacteria. The mentioned pretreatment device comprises: a treatment tank in which sewage is introduced to be reserved; at least one chemical supply device for supplying the treatment tank with decomposition accelerating agent such as fluorine which accelerates decomposition by fermentation or putrefaction of solid wastes after crushing garbage, and for promotion activity of anaerobic bacteria which digests the solid wastes and water pollution materials; a baffle plate which is disposed horizontally to inhibit the solid wastes from floating upward to liquid level; temperature control means for controlling temperature of sewage in the treatment tank; and a sewage stirring device for stirring sewage in the treatment tank. The sewage treatment device comprises: an air supply pipe which is disposed at the bottom of the device and connected to an air in-flow pipe; a porous member of certain thickness wrapped on outer periphery of a mesh-like or grid-like cylindrical core; and sewage treatment tanks in which a plurality of activated slugde process beds are disposed vertically and fixed by fixing means, each of said sewage treatment tanks communicating with an adjacent tank through a passage; and wherein arrangement of the activated sludge process beds varies for each of the sewage treatment tanks so that kind of bacteria forming activated sludge, breeding ratio between aerobic and anaerobic bacterias, distribution thereof, etc. may undergo stepwise changes. Furthermore, a last sewage treatment tank in the sewage treatment device communicates with a settling tank thropugh a passage, this settling tank communicates with a disinfection tank through a passage, and this disinfection tank is connected to a treated water drain pipe.

In the waste water treatment equipment of above construction, solid wastes such as fibrous materials left after crushing garbage in the sewage are decomposed not only by fermentation and putrefation but also by anaerobic digestion of anaerobic bacteria, and water pollution materials in the sewage are also subject to digestion of anaerobic bacteria. Then, the sewage not containing the solid wastes (already removed) is delivered from the pretreatment device to the sewage treatment device, in which the sewage flows sequentially in each of the sewage treatment tanks having activated sludge process beds of different breeding phases in the order of installation thereof, whereby the sewage is efficiently treated starting from the treatment of high load to that of low load while trying to balance nutrition among air, nitrogen and phosphorus according to the level of purification in the course of respective treating operations. Then, the sewage which has been treated in order starting from the treatment of high load to that of low load during passage through the plurality of sewage treatment tanks, is subject to removal of wastes by precipitation in the settling tank. Finally, disinfection treatment is applied to the sewage in the disinfection tank, the disinfected sewage being drained out as treated water through the treated sewage drain pipe.

Since the waste water treatment equipment in accordance with the invention is constructed and performs the functions as described above, every waste water sent out from various sources including sewage containing solid wastes left after crushing garbage sent out from home kitchen, cooking room, etc. can be treated with very high removing performace by means of the waste water treatment equipment of the invention.

Other objects, features and advantages of the invention will become apparent in the course of the following description with reference to the accompanying drawings.

DESCRIPTION OF DRAWINGS

FIG. 3 is a perspective view showing an example of entire arrangement of activated sludge process bed incorporated in the above treatment equipment;

FIG. 4 is a perspective view showing another example of activated sludge process bed; and FIG. 5 is a partially cutout perspective view of an activated sludge process bed.

DESCRIPTION OF PREFERRED EMBODIMENT

A preferred embodiment of the present invention is hereinafter described with reference to the accompanying drawings.

Figure 1:
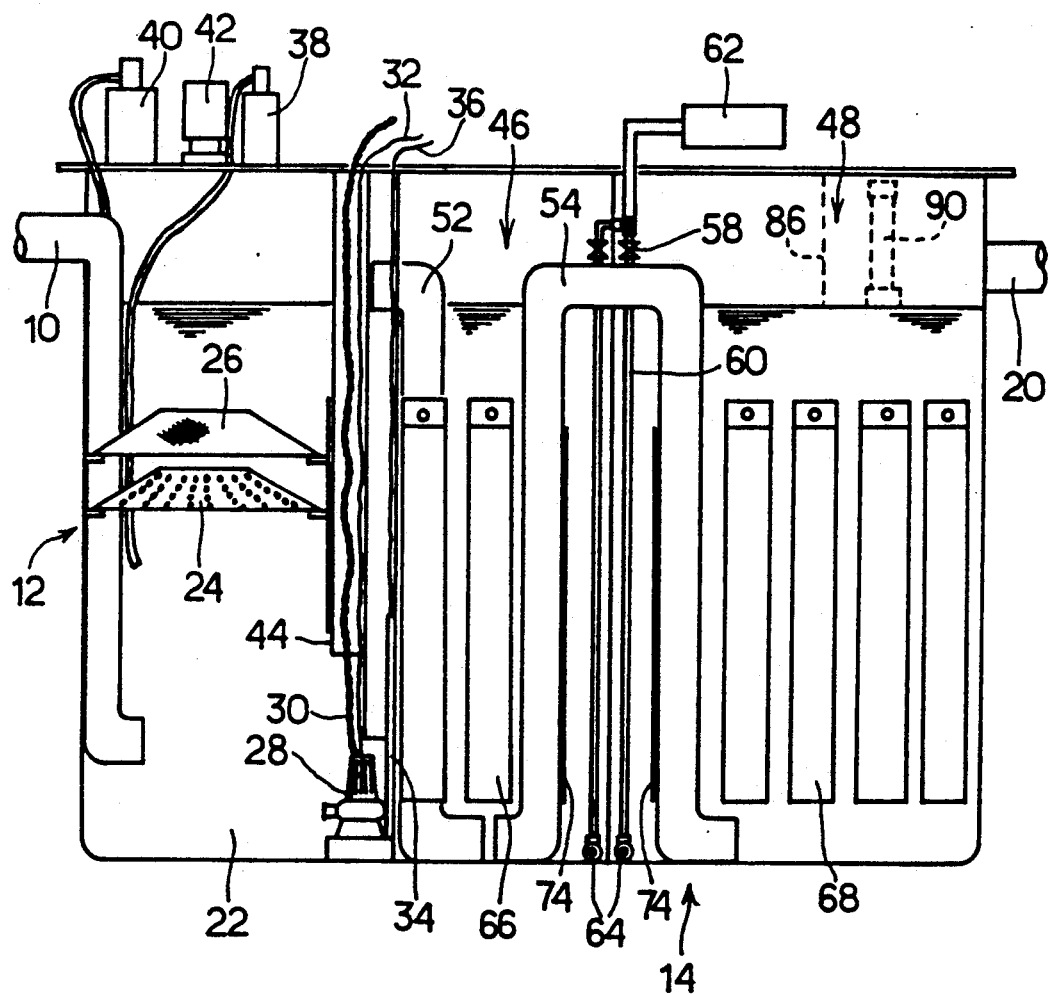
FIG. 1 is a front sectional view showing an entire arrangement of the waste water treatment equipment in accordance with one embodiment of the present invention.
Figure 2:
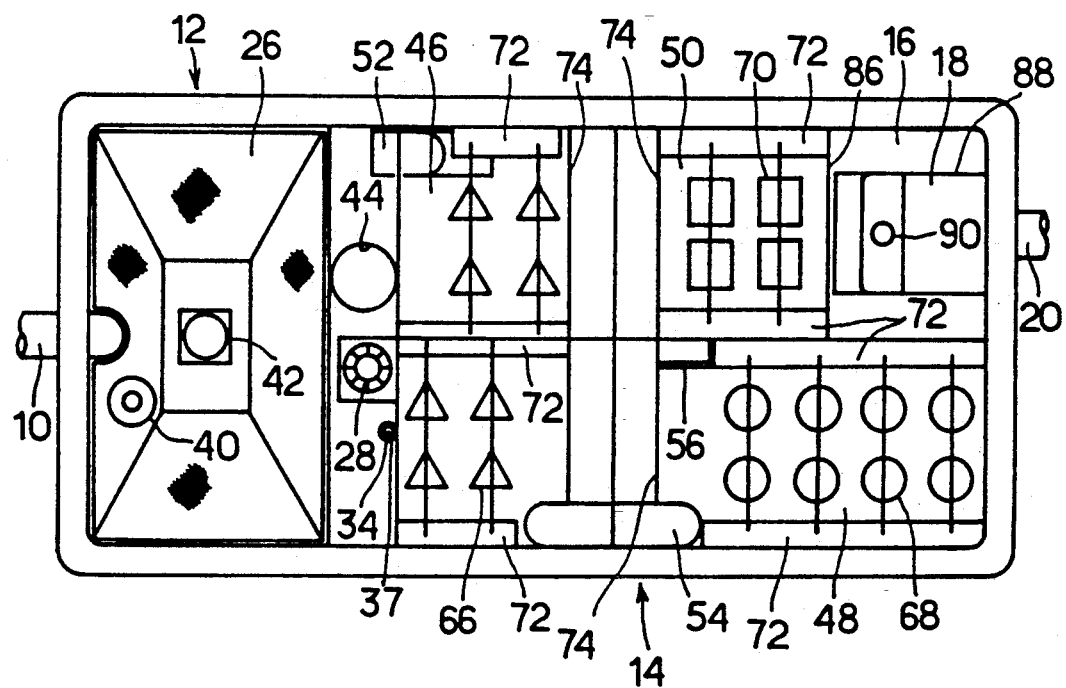
FIG. 2 is a plan view of the equipment shown in FIG. 1.

FIGS. 1 and 2 show an embodiment of the invention, and in which FIG. 1 is a front sectional view showing an entire arrangement of a waste water treatment equipment and FIG. 2 a plan view thereof.

This waste water treatment equipment comprises: a pretreatment device 12 connected to an end of a sewage introduction pipe 10 for introducing various sewages such as sewage containing solid wastes like fibrous materials left after crushing garbage sent out from cooking room, home kitchen, etc. or sewage drained out of water closet, bath, etc; a sewage treatment device 14 connected to the pretreatment device 12 through a passage; a settling tank 16 connected to the sewage treatment device 14 through a passage; and a disinfection tank 18 connected to the settling tank 16, and to which a treated sewage drain pipe 20 is connected.

The pretreatment device 12 has a treatment tank 22 for reserving sewage flowing therein through the sewage introduction pipe 10. On the vertically middle portion of the internal part of the treatment tank 22, a baffle plate 24 is disposed horizontally to inhibit solid wastes from floating upward to liquid level. The baffle plate 24 is provided with a large number of small holes to pass sewage therethrough. Disposed right above the baffle plate 24 in parallel thereto is a stainless steel gauge 26 for filtering. Installed on the bottom of the treatment tank 22 is a stirring submergible pump 28 for stirring the sewage in the treatment tank 22. Reference numeral 30 denotes a chain for lifting the submergible pump 28 when the pump 28 is to be replaced or inspected, and numeral 32 denotes a power cord of the submergible pump 28. Disposed also in the treatment tank 22 is a sheath heater 34 provided with a temperature controller for controlling sewage temperature in the treatment tank 22. Numeral 36 denotes a power code of the sheath heater 34, and numeral 37 denotes a protective pipe. Disposed above the treatment tank 22 are a fluorine dropper 38 for dropping fluorine into the treatment tank 22 as an accelerator for accelerating the decomposition by fermentation or putrefaction of solid wastes such as fibrous materials left even after crushing garbage, and a chemical dropper 40 for dropping a chemical into the treatment tank 22 as an accelerator for accelerating activity of anaerobic bacteria performing anaerobic digestion of the solid wastes and water pollution materials, said chemical including an aqueous solution of a material containing natural emulsion surfactant and saponin both extracted from plants. The chemical dropped from the chemical dropper 40 also performs a function of restricting exhaltation of offensive odor. Disposed also above the treatment tank 22 is a small type ozonizer 42 employed as a deodorizing device for decomposing the components of offensive odor generated during the steps of fermentation or putrefaction of solid wastes and anaerobic digestion of water pollution materials. In the drawing, numeral 44 denotes a vacuum suction hole for removing the sewage and solid wastes from the treatment tank 22 by vacuum suction with a vacuum car in the event of trouble, accident or the like.

Construction of the sewage treatment device 14 is hereunder described. The sewage treatment device 14 comprises a plurality of sewage treatment tanks, i.e., a first sewage treatment tank 46, a second sewage treatment tank 48, and a third sewage treatment tank 50 in this embidment.

The treatment tank 22 of the pretreatment device 12 and the first tank 46 communicate with each other through a sewage overflow pipe 52, and the sewage, having passed through the baffle plate 24 and the filtering stainless gauze 26 upward the liquid level and not containing solid waste any more, flows in the first tank 46 by way of the mentioned overflow pipe 52. The first tank 46 and the second tank 48 communicate with each other through a sewage overflow pipe 54. The second tank 48 and the third tank 50 communicate with each other through a treated sewage overflow baffle 56.

Disposed at the inner bottom of each of the first, second and third ranks 46, 48, 50 is an oxigen desolving and diffusing machine 64 connected to an air in-flow blower 62 through an air introduction pipe 60 incorporating an air in-flow regulating valve 58. A plurality of activated sludge process beds 66, 68, 70 are vertically provided in internal part of each of the tanks 46, 48, 50. Numeral 72 denotes a support member for securely supporting the activated sludge process beds 66, 68, 70. A sewage diffusion and flow guide plate 74 is also provided vertically in each of the tanks 46, 48, 50.

Each of the activated sludge process beds, of which partially cutout enlarged view is shown in FIG. 5, comprises an elongated cylindrical core 76 of a hard synthetic resin resistant to corrosion for a long period of immersion in sewage and having a mesh-like or grid-like peripheral surface, a porous member 78 with which the cylindrical core 76 is wrapped at a certain thickness, i.e., 15 to 20 mm in thickness, tightening rings 80 for tightening upper and lower parts of each bed as shown in FIGS. 3 and 4, and a tightening belts 82 for tightening the porous member 78 to the cylindrical core 76 at several portions. In addition, numeral 84 denotes holes provided on each of the tightening rings 80 into which support rods for supporting the beds are inserted. The porous member 78 is formed of a lot of corrosion resistant vinylidene chloride yarns intertwisted one another or other spongy, mesh-like or fibrous synthetic resin. These activated sludge process beds 66, 68, 70 are of different forms respectively tank by tank as illustrated in FIGS. 3 and 4. That is, in the case of the activated sludge process bed shown in FIG. 3, the porous member 78 is cut out at a certain width in spiral form and the cylindrical core 76 is partially exposed. In the case of the activated sludge process bed shown in FIG. 4, entire surface of the cylindrical core 76 is coated with the porous member 78.

In the foregoing activated sludge process beds shown in FIGS. 3 and 4, variation is given to the arrangement of the respective beds by changing the area coating the cylindrical core 76 with the porous member 78 (i.e., exposed area of the cylindrical core 76 left after partial cutout of the porous member 78). Alternatively, it is preferable to give variation to the arrangement of the beds by changing shape itself of each bed such as being triangular, circular or square in section, for example.

A partition wall 86 is provided between the third tank 72 and adjacent settling tank 16, and these two tanks 72, 16 communicate with each other through an overflow window (not illustrated) disposed in the third tank 72. Another partition wall 88 is provided between the settling tank 16 and disinfection tank 18, and the intermediately treated sewage in the settling tank 16 flows in the disinfection tank 18 overflowing the upper edge of the partition wall 88. Disposed in the disinfection tank 18 is disinfector, i.g., a small plate type ozonizer 90. Disinfector other than the ozonizer may be disposed for disinfection, and it is also preferable to install a disinfectant supply device above the disinfection tank 18. A treated sewage drain pipe 20 communicates with the disinfection tank 18 so that the treated sewage or water may be drained through the drain pipe 20.

In the sewage treatment equipment of above construction, operation of sewage treatment is performed as described below.

When a sewage containing solid wastes left after crushing garbage sent out from cooking room, home kitchen, etc. or a sewage sent out from water closet, bath, etc. flows in the treatment tank 22 of the pretreatment device 12 through the sewage introduction pipe 10, the sewage in the treatment tank 22 is stirred by means of the stirring submergible pump 28 installed on the bottom of the treatment tank 22, meanwhile temperature of the sewage in the treatment tank 22 is adjusted to a predetermined temperature by means of the seath heater provided with a temperature controller. At this time, the solid wastes in the sewage moving in the treatment tank 22 while being stirred is inhibited from floating upward to liquid level by means of the baffle plate 24 provided in the middle part of the treatment tank 22. Fluorine and a predetermined chemical are dropped respectively from the fluorine dropper 38 and the chemical dropper 40 into the treatment tank 22 and mixed with the sewage. Then, during circulation of the sewage in the treatment tank 22, the solid wastes such as fibrous materials left after crushing garbage in the sewage are decomposed by fermentation or putrefaction, and further the solid wastes and water polution materials are decomposed by digestion of anaerobic bacteria.

Then, supernatant liquid passing through the large number of small holes provided through the baffle plate 24 in the internal part of the treatment tank 22 of the pretreatment device 12 and the filtering stainless steel gauze 26 right above the baffle plate 24 thereof, flows in the first tank 46 of the sewage treatment device 14 through the sewage overflow pipe 52. Subsequently, the sewage flows from the first tank 46 to the second tank 48 through the sewage overflow pipe 54, and from the second tank 48 to the third tank 50 through the treated sewage overflow baffle 56, in sequential order.

In each of the treatment tanks 46, 48, 50, air is blown from the air in-flow blower 62 to the sewage through the oxigen desolving and diffusing machine 64 by way of the air introduction pipe 60, thereby oxigen being dissolved and diffused in the sewage. The sewage containing such dissolved oxigen comes in contact with the plurality of activated sludge process beds 66, 68, 70 vertically provided in each of the tanks 46, 48, 50, whereby water pollution materials such as BOD, COD, etc. are decomposed by aerobic and anaerobic bacterias sticked to and cultured in the activated sludge beds 66, 68, 70, while such aerobic and anaerobic bacterias breed themselves utilizing a part of energy obtained during the process. In this connection, since the activated sludge process beds 66, 68, 70 are of elongated cylindrical shape, concentration of the mentioned dissolved oxigen (hereinafter referred to "DO value") is different between inside and uotside of the cylinder. Generally, it may be said that aerobic bacteria is bred on the surface layer portion of the cylindrical outer periphery of the beds 66, 68, 70, while anaerobic bacteria being bred on the surface layer portion of the cylindrical inner periphery. In the meantime, giant micro-organism such as zooglea bacteria, sphaerotilus, Nematoda or water mite are spontaneously bred or come to live at the center portion of the porous member of the activated sludge beds 66, 68, 70 and eat away excess aerobic and anaerobic bacterias to autolize them, whereby excessive breeding of aerobic and anaerobic bacterias being prevented, which results in prevention from generation of excessive sludge. Further, since physical environment, i.e., cylindrical surface area formed by coating the elongated cylindrical core 76 with the porous member 78 in each of the activated sludge process beds 66, 68, 70 each provided in the frist, second and third tanks 46, 48, 50, varies for each tank, flow rate of the sewage with increased DO value also varies for each tank between the inside and outside of each cylinder. As a result, kind of bacterias forming the activated sludge, breeding ratio between aerobic and anaerobic bacterias, distribution thereof, etc. undergo stepwise changes. Further, by reducing sequentially amount of air supplied from the aeration pipe for each tanks 46, 48, 50 in the order of installation thereof so as to vary DO value in each of the tanks 46, 48, 50, the activated sludge process beds each having a different breeding layer of aerobic and anaerobic bacterias can be more effectively constructed. As a result of forming respective activated sludge process beds as mentioned above, performances of respective bacterias, i.e., performance of aerobic bacteria superior in the treatment of high load and that of anaerobic bacteria superior in the treatment of low load as well as in removal of nitrogen can be presented at their maximum. Consequently, the sewage can be efficiently treated in order starting from the treatment of high load to that of low load in the sewage treatment device 14, while balancing nutrition among air, nitrogen and phosphorus according to the level of purification in each tank.

The sewage having completed the treatments of high load and low load during passage through the first, second and third tanks 46, 48, 50 then flows from the the third tank 50 into the settling tank 16 through the overflow window of the partition wall 86. In this settling tank 86, the solid wastes in the sewage precipitates and deposited on the bottom of the tank to be completely removed. Finally, the sewage flows in the disinfection tank 18 overflowing the upper edge of the partition wall 88 and is subject to disinfection by the small plate type ozonizer 90, and then the treated sewage is drained out of the disinfection tank 18 through the treated sewage drain pipe 20.

Following Table 1 shows results of actual treatment of sewage using the foregoing waste water treatment equipment, and in which original waste water was a mixtrure composed of (1) a waste water left after crushing garbage sent out from a cooking room, and (2) a row sewage and other waste water sent out from home. The former occupied 38% and the latter 62% in quantity of the mixed sewage. BOD concentration of the waste water from cooking room was 5,000 mg/l while that of row sewage and waste water from home was 210 mg/l, and thus BOD concentration of the whole mixed sewage was 2,030.2 mg/l.

It is understood from Table 1 that BOD concentration of the treated sewage was 3.0 mg/l, and thus percentage of removal achieved by the entire waste water treatment equipment was 99.85%.

TABLE 1

| Sewage treatment tank | Water quality index | In-flow density (ppm) | Out-flow density (ppm) | Removal (%) | Volume load (kg/m³ day) | Necessary amount of air (m³/min) |
|---|---|---|---|---|---|---|
| Pretreatment tank | BOD | 2,030.2 | 812.0 | 60 | | |
| 1st tank | BOD | 812.0 | 81.2 | 90 | 2.8 | 43 |
| 2nd tank | BOD | 81.2 | 12.2 | 85 | 0.27 | 4 |
| 3rd tank | BOD | 12.2 | 3.0 | 75 | 0.02 | 0.5 |
| Settling tank | BOD | 3.0 | | | | |

What is claimed is:
1. A waste water treatment apparatus comprising:
a pretreatment device having a treatment tank for receiving waste water containing solid organic wastes, a chemical supply device for supplying said treatment tank with a decomposition accelerating agent which accelerates decomposition by fermentation or putrefaction of the solid organic wastes and a chemical supply device for supplying a chemical for promoting activity of anaerobic bacteria which performs anaerobic digestion of the solid organic wastes and water pollution materials, a baffle plate which is disposed horizontally in said treatment tank for inhibiting the solid organic wastes from floating upward, temperature control means for controlling the temperature of sewage in said treatment tank, and a sewage stirring device for stirring sewage in said treatment tank;
a sewage treatment device having a plurality of sewage treatment tanks connected in series to said treatment tank of said pretreatment device through a passage for receiving liquid sewage wastes and removing water pollution materials in the liquid sewage wastes by oxidation decomposition;
a settling tank connected to said plurality of sewage treatment tanks of said sewage treatment device through a passage;
a disinfecting tank connecting to said settling tank; and
a treated sewage drain pipe connected to said disinfecting tank;
wherein said sewage treatment device further comprises: an air supply pipe disposed at the bottom thereof, said air supply pipe being connected to an air in-flow pipe; a porous member wrapped on outer periphery of a mesh-like or grid-like cylindrical core; a plurality of activated sludge process beds disposed vertically and fixed by fixing means; each of said plurality of sewage treatment tanks communicating with an adjacent tank through a passage; and wherein the arrangement of said activated sludge process beds varies for each of the sewage treatment tanks so that bacteria forming activated sludge, breeding ratios between aerobic and anaerobic bacterias, and distribution thereof, may undergo stepwise changes.

* * * * *